(12) United States Patent
Kennedy et al.

(10) Patent No.: US 7,225,247 B2
(45) Date of Patent: May 29, 2007

(54) SERIAL PORT REDIRECTION USING A MANAGEMENT CONTROLLER

(75) Inventors: Barry Kennedy, Hillsboro, OR (US); Thomas M. Slaight, Beaverton, OR (US); Brett S. Pemble, Keizer, OR (US); Thomas William Erdman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 10/274,210

(22) Filed: Oct. 17, 2002

(65) Prior Publication Data

US 2004/0078456 A1  Apr. 22, 2004

(51) Int. Cl.
*G06F 15/16* (2006.01)

(52) U.S. Cl. .......................... 709/223; 710/10; 710/100

(58) Field of Classification Search ................ 710/105, 710/313, 710, 20, 100, 305; 709/223
See application file for complete search history.

(56) References Cited

U.S. PATENT DOCUMENTS

| | | | | |
|---|---|---|---|---|
| 4,652,874 | A * | 3/1987 | Loyer | 370/451 |
| 6,192,423 | B1 * | 2/2001 | Graf | 710/31 |
| 6,881,096 | B2 * | 4/2005 | Brown et al. | 439/620 |
| 6,952,659 | B2 * | 10/2005 | King et al. | 702/186 |
| 6,973,598 | B2 * | 12/2005 | Masuyama et al. | 714/45 |
| 7,099,981 | B2 * | 8/2006 | Chu | 710/301 |
| 2002/0018222 | A1 * | 2/2002 | Coyle et al. | 358/1.1 |
| 2002/0129099 | A1 * | 9/2002 | Kehne et al. | 709/203 |
| 2003/0131137 | A1 * | 7/2003 | Chosnek et al. | 709/250 |

OTHER PUBLICATIONS

HP Invent; Compaq Remote Insight Lights-Out Edition; QuickSpecs Overview; North America, Version 9, Aug. 11, 2003; Models 157866-001; 5 pages.
Compaq Systems Management Server Management Remote Server Management Integrated Remote Console; Oct. 1996; USA Jun. 20, 2006; 9 pages.
Compaq: Remote Insight Lights-Out Edition II User Guide; Part No. 232664-001; Version 1.0; May 2001 (1st Ed.); 170 pages.
HP Integrated LIghts-Out User Guide; Part No. 238882-003; Aug. 2002 (3rd Ed.); 210 pages.

* cited by examiner

*Primary Examiner*—Moustafa M. Meky
(74) *Attorney, Agent, or Firm*—Philip A. Pedigo

(57) ABSTRACT

A method and apparatus is provided for serial port redirection using a management controller. A serial controller is selectively coupled with a management controller to facilitate the redirection of serial information. The management controller includes a packetizer to packetize the serial information. The packetized information may be communicated to remote computing devices over a network connection or a management bus. The management controller receives both redirection and non-redirection packets from the communication channel. If the management controller receives redirection packets from a remote computing device, it formats the redirection packets as a stream of serial information and communicates the stream of serial information to the serial controller.

14 Claims, 9 Drawing Sheets

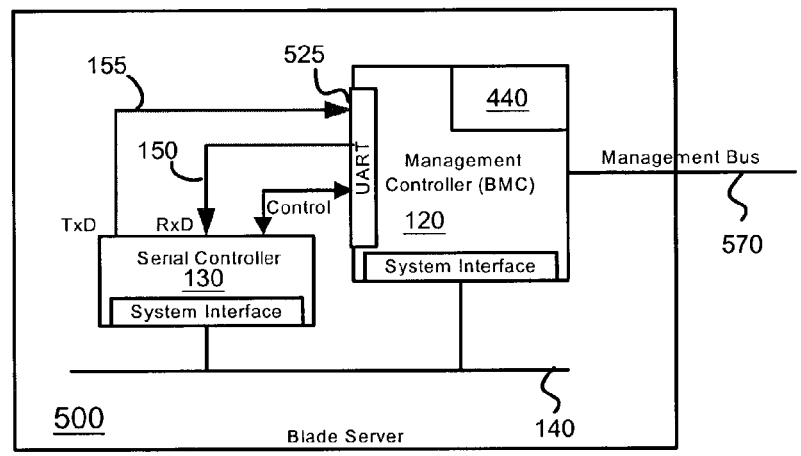
FIG. 5A
FIG. 5B
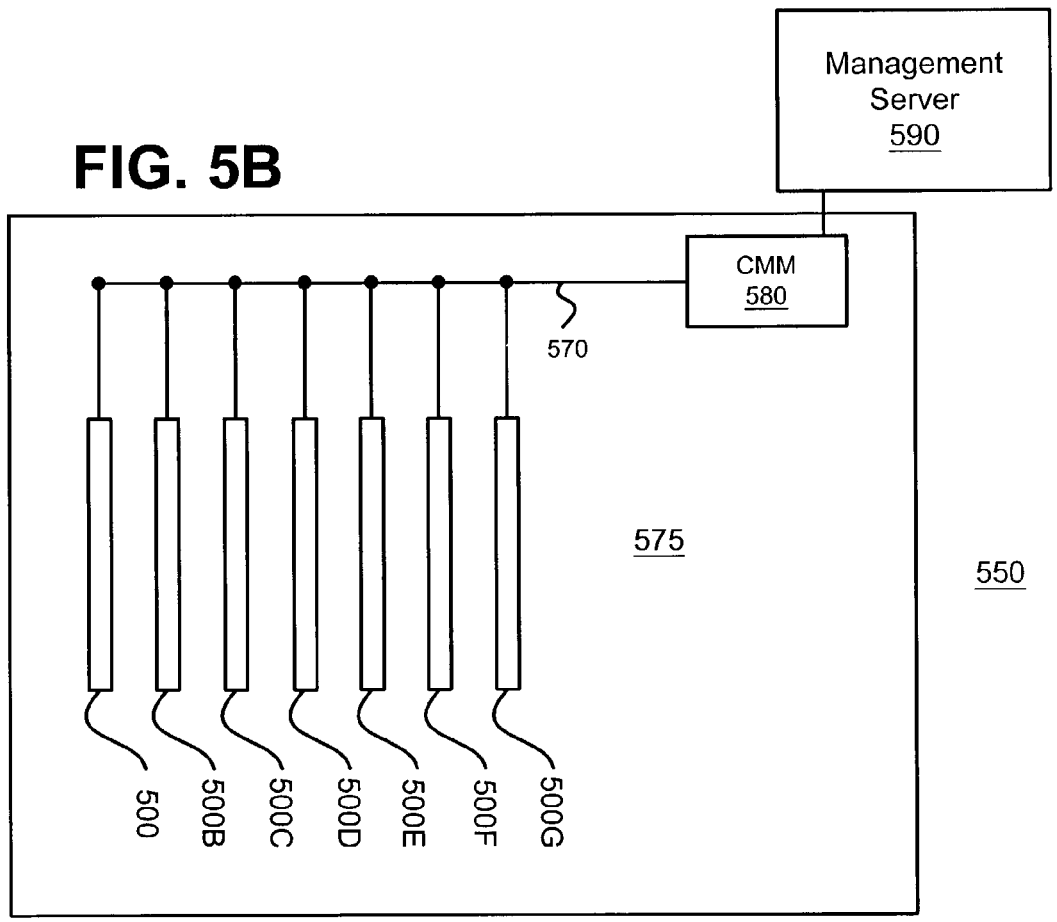

SERIAL PORT REDIRECTION USING A MANAGEMENT CONTROLLER

TECHNICAL FIELD

Embodiments of the invention relate to improving the communication of information between computing devices. More particularly, specific embodiments of the invention relate to serial port redirection using a management controller.

BACKGROUND

A serial port is an interface that can be used for serial communication. Serial communication involves the transfer of information one bit at a time. Serial ports are general-purpose interfaces that can facilitate information exchange with a wide variety of devices including modems, computing devices, and pointing devices.

Computing devices use serial controllers to control the flow of information through a serial port. Most serial port controllers use a universal asynchronous receiver-transmitter (UART) to transmit and receive information through a serial port. A computing device can be a mainframe computer, desktop computer, laptop computer, personal digital assistant, server, blade server, client, router, switch, or similar device. The term "system" is used as a shorthand for a computing device or part of a computing device. A blade server is a computing device form factor wherein a single module contains components such as processors, memory devices, and network connections that are found on multiple boards in conventional servers. A blade chassis supports multiple blade modules and provides a backplane through which the blade modules get connections to input/output interfaces and power.

A management controller controls and monitors the management features of a computing device. For example, the management controller may use one or more sensors to monitor temperature, voltage, fan, and chassis intrusion within a computing device. The management controller autonomously monitors system management events (e.g., over-voltage or over-temperature) and typically logs the occurrence of the events into non-volatile memory in a predefined format (e.g., a sensor error log). Management controllers can also be polled to determine the current monitored status of a computing device. Alternatively, management controllers can be configured to automatically send an alert message when an error condition is detected either manually or by software running within the management controller.

FIG. 1 is a block diagram of selected components of conventional computing device 100. Conventional computing device 100 includes serial port 110, network interface 115, management controller 120, and serial controller 130. Serial controller 130 exchanges serial information with the serial port through receive information line 150 and transmit information line 155. Handshake signals 156 control the flow of transmit and receive information. Management controller 120 and serial controller 130 connect to other elements of conventional computing device (not shown) through communication channels 175 and 180 respectively.

Serial port 110 uses communication channel 160 to exchange information with one or more remote devices. Typically, serial port 110 complies with the Electronic Industries Association Recommended Standard-232 entitled, "Interface Between Data Terminal Equipment and Data Communications Equipment Employing Serial Binary Data Interchange" (RS-232 standard) or a similar standard governing serial communications between computing devices. Communication channel 160 may connect with a remote computing device to facilitate the exchange of management information between the remote computing device and computing device 100.

Management controller 120 connects with network interface 115 through communication channel 185. Network interface 115 may be an Ethernet interface, Token Ring interface, Fiber Channel High Speed interface, Fiber Distributed Data Interface or the like. Network interfaces are well known to one of ordinary skill in the art and will therefore not be further described except as they relate to embodiments of the invention. Computing device 100 may use communication channel 170 to exchange management information with one or more remote computing devices.

FIG. 1 illustrates that conventional computing systems typically employ more than one communication channel (e.g., channels 160 and 170) to exchange information with remote computing devices. Using multiple communication channels increases the number of physical cables that attach to computing device 100. Computing device 100 may be, for example, in a rack containing dozens of servers, or may be used as a blade server in a rack containing dozens (or hundreds) of other blade servers. Clearly, any increase in the number of physical cables connecting to each computing device increases the cost and complexity of the overall system.

BRIEF DESCRIPTION OF THE DRAWINGS

Embodiments of the invention are illustrated by way of example, and not by way of limitation, in the figures of the accompanying drawings in which like reference numerals refer to similar elements:

FIGS. 5A and 5B illustrate certain aspects of an alternate embodiment of the invention in which serial information is transparently redirected to/from a management bus;

DETAILED DESCRIPTION

In the following description various aspects of the invention, serial port redirection using a management controller, are described. Specific details will be set forth in order to provide a thorough understanding of the invention. It will be apparent, however, to those skilled in the art that the invention may be practiced with only some or all of the described aspects of the invention, and with or without some or all of the specific details. In some instances, well-known architectures, steps, and techniques have not been shown to avoid unnecessarily obscuring the invention. For example, specific details are not provided as to whether some aspects of the method and apparatus are implemented as software routines, hardware circuits, firmware, or a combination thereof.

"Information" as used herein is binary machine-readable information and can include both data and instructions. Management information is information exchanged between computing devices to monitor and control the functioning of computing devices. Management information may include data collected by one or more sensors (e.g., an over-voltage sensor), remote reset instructions, event log entries, power on/off instructions, configuration data and instructions, current status information and the like. Text-based information is machine-readable information that represents text.

Figure 2:
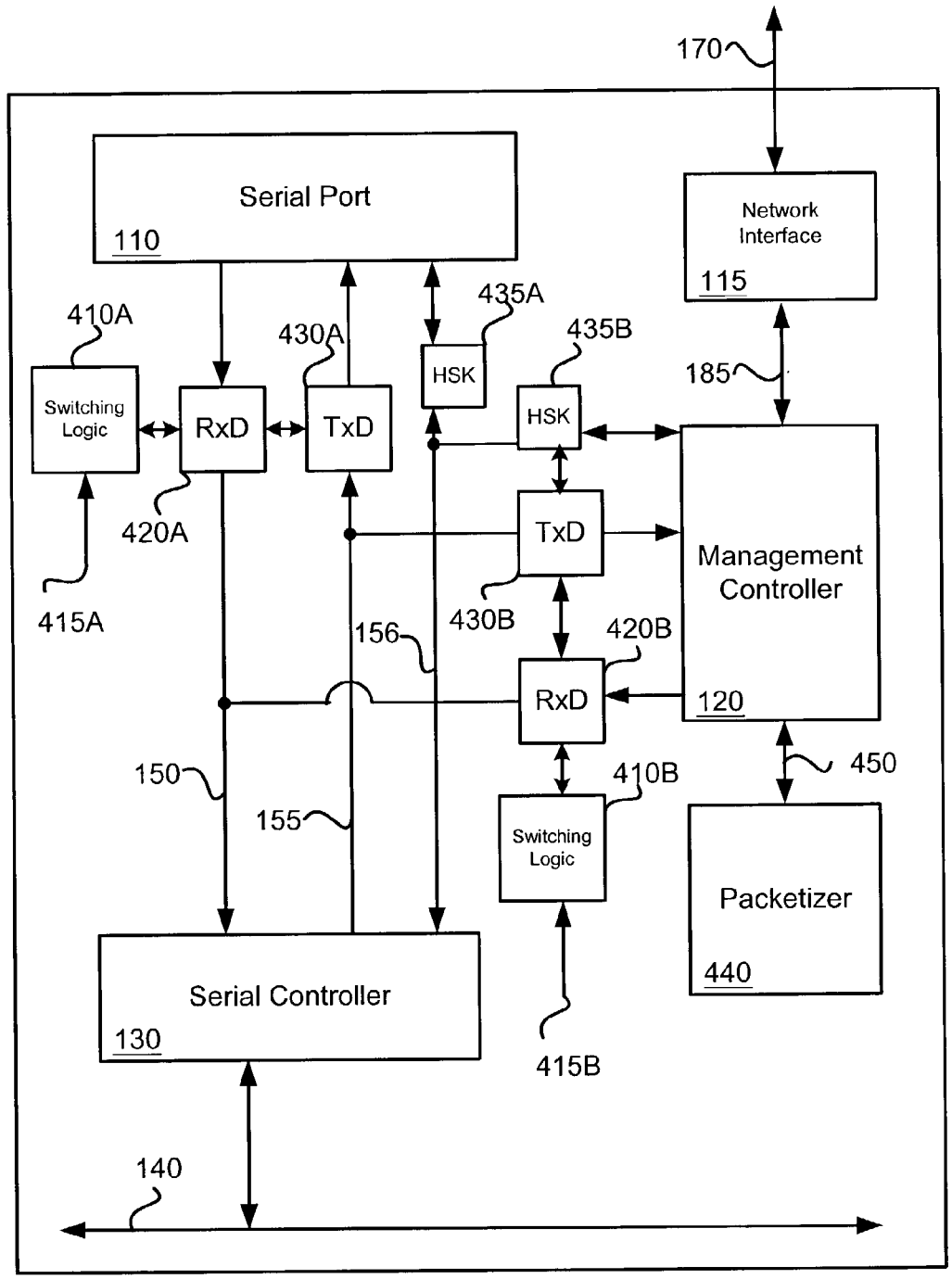
FIG. 2 is block diagram illustrating selected elements of computing device 200.

FIG. 2 is block diagram of selected elements of computing device 200. Some elements of computing device 200 are similar to elements in computing device 100 and those elements are similarly numbered. In addition, computing system 200 includes switching logic 410A and B, switching logic control signals 415A and B, receive information switches (RxD) 420A and B, transmit information switches (TxD) 430A and B, handshake signal switches 435A and B, and packetizer 440. In one embodiment of the invention, the additional elements in computing device 200 provide a means to redirect serial information through management controller 120 and onto a network through communication channel 170. In an embodiment of the invention, switches 420A and B, 430A and B, and 435A and B are controlled by signals 415A and B. In one embodiment of the invention, management controller 120 controls the switching. In alternative embodiments of the invention, the computing system may control switching via signals 415A and B. Since computing device 200 is able to redirect serial information to a network interface, it does not need communication channel 160. Thus, in one embodiment of the invention, the number of physical cables connected to computing device 200 is reduced.

Figure 3:
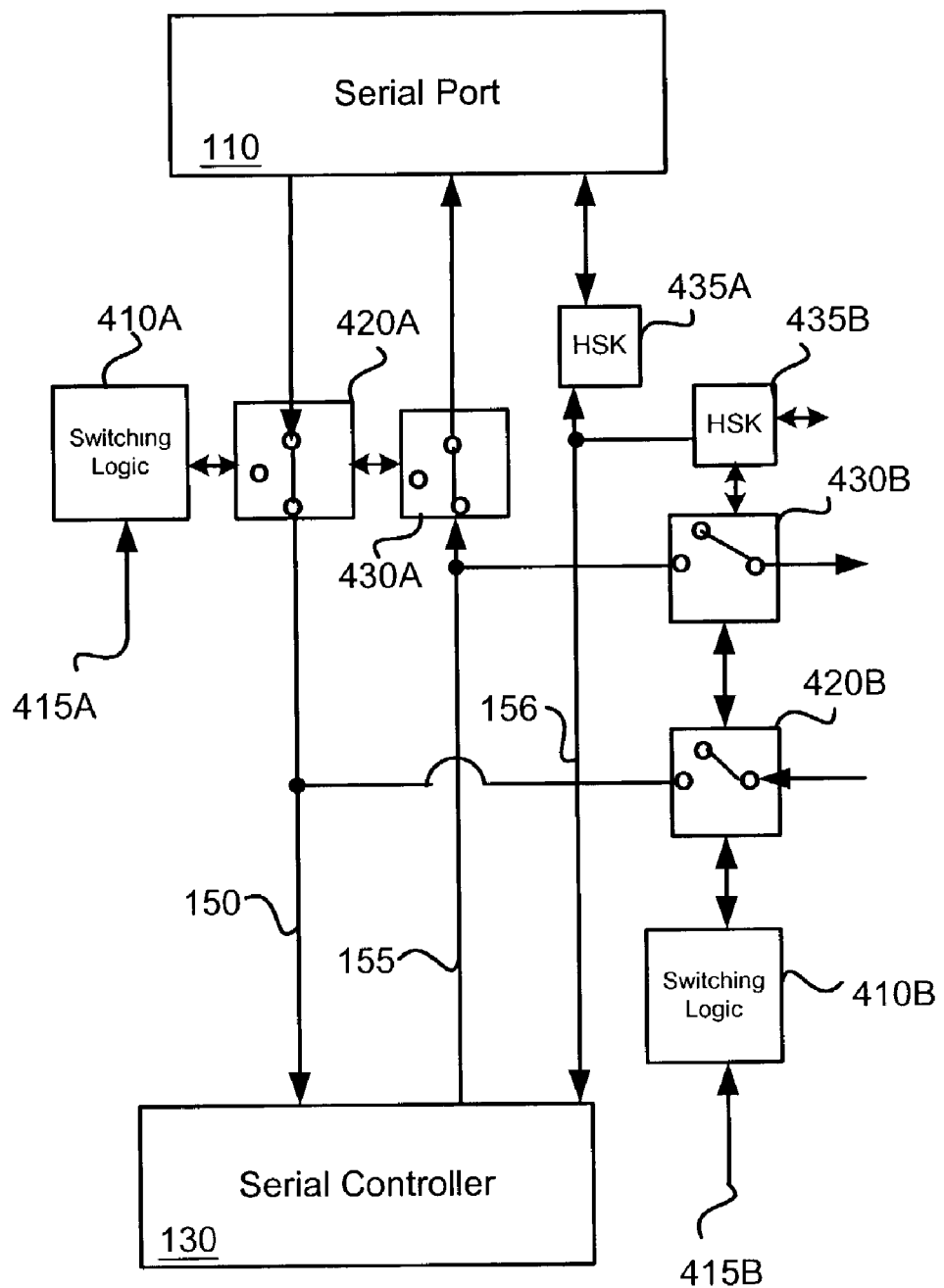
FIG. 3 illustrates certain aspects of an embodiment of the invention wherein computing device 300 is configured to deliver serial information to serial port 110.

FIG. 3 illustrates certain aspects of an embodiment of the invention wherein computing device 300 is configured to deliver serial information to serial port 110. In FIG. 3, switches 420B and 430B are open to prevent serial information from being transmitted and received through management controller 120 (not shown). In contrast, switches 420A and 430A are closed and serial information flows freely between serial controller 130 and serial port 110. In some embodiments of the invention, switches 420A and B and 430A and B are integrated into a single switching array. Similarly, in some embodiments of the invention, switching logic 410A and B are integrated into a single device, integrated into serial controller 130, or integrated with one or more of the switches. In some embodiments of the invention in which computing device 400 is a server or blade server, switches 420A and B, 430A and B, and switching logic 410A and B are integrated with the server baseboard.

Figure 4:
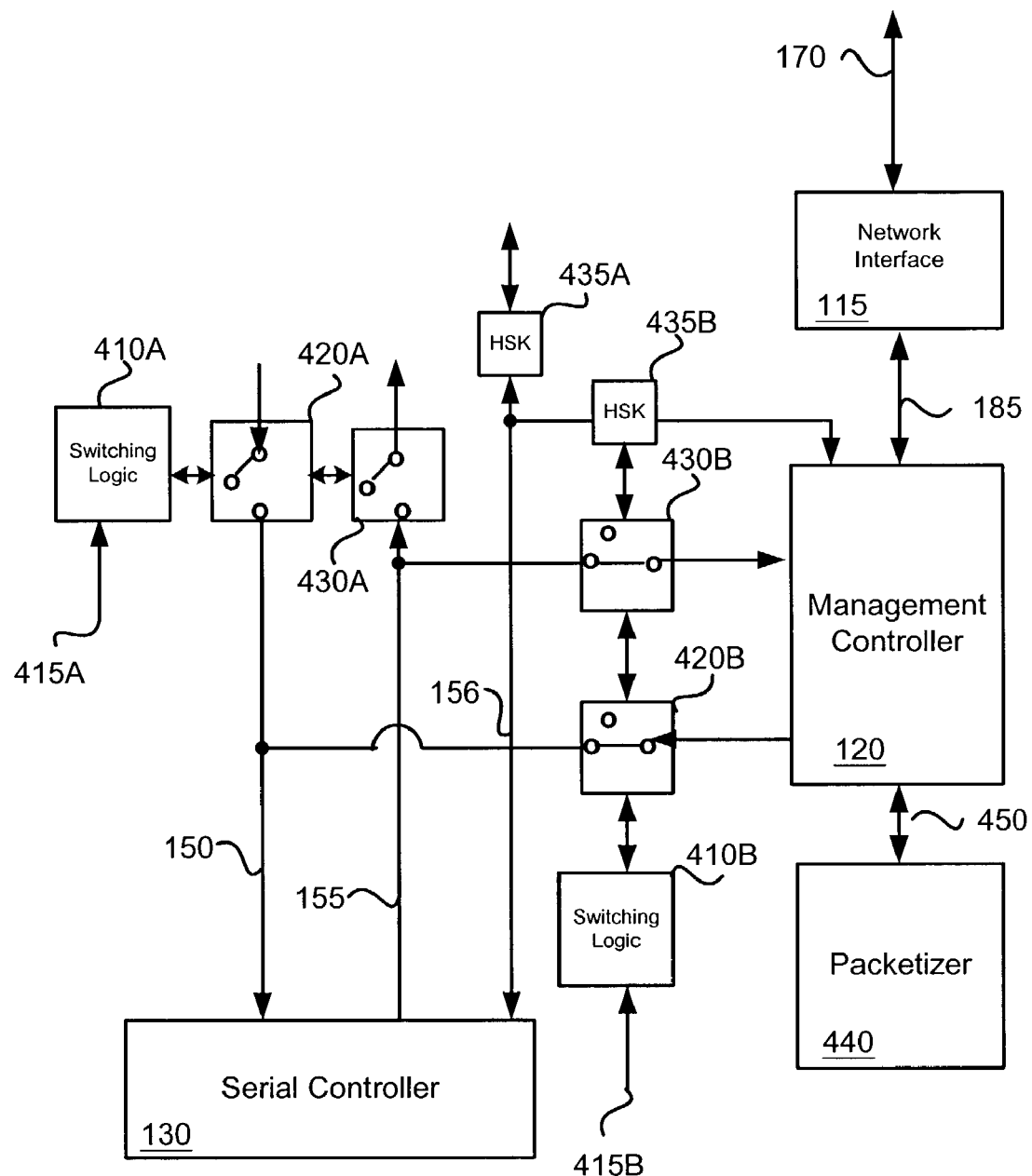
FIG. 4 illustrates certain aspects of an embodiment of the invention wherein serial information is redirected to management controller 120 and then to communication channel 170 via communication channel 185 and network interface 115.

FIG. 4 illustrates certain aspects of an embodiment of the invention wherein serial information is redirected to management controller 120. Switching logic 410B closes the connections in switches 430B and 420B and switching logic 410A opens the connections in switches 420A and 430A. The flow of serial information is therefore directed through management controller 120 instead of serial port 110. In an embodiment of the invention, the terminals of the open switches (e.g., switches 420A and 430A) are driven to appropriate direct current levels using tri-state logic or the like. Redirecting the flow of serial information from serial controller 130 to management controller 120 takes advantage of the fact that serial controller 130 is already supported by the operating system and applications running on computing device 400 and, thus, no special drivers or operating system modifications are required.

The output of switch 430B delivers a stream of serial information to management controller 120. In some embodiments of the invention, the received stream of serial information is "packetized" to prepare the information for communication over a packet switched network. "Packetized" means the serial information is divided into smaller units of information called packets according to the requirements of a network transport service. Examples of such network transport services includes Internetwork Packet eXchange (IPX), Transmission Control Protocol/Internet Protocol (TCP/IP), User Datagram Protocol/Internet Protocol (UDP/IP), NetBEUI, NetBIOS over IP, NetBIOS over IPX, and the like. Packetizing may be accomplished with software routines, hardware circuits, firmware, or some combination thereof. Packetizing is well known to those of ordinary skill in the art and will not be further described except as it relates to embodiments of the invention.

The packetized information is delivered to network interface 115 through communication channel 185 (hereinafter "redirection packets"). In one embodiment of the invention, communication channel 170 interfaces with a local area network (LAN). In such an embodiment, network interface 115 is typically a LAN controller. The redirection of the serial information over the LAN is transparent to the operating system because the operating system merely delivers information to the serial controller exactly as if the information were to be communicated via a serial port. Network interface 115 may be an Ethernet interface, Token Ring interface, Fiber Channel High Speed interface, Fiber Distributed Data Interface or the like. Network interfaces are well known to one of ordinary skill in the art and will therefore not be further described except as they relate to embodiments of the invention.

In some embodiments of the invention, the stream of packets through network interface 115 comprises two components: redirection packets and non-redirection packets. The non-redirection packets are packets sent to/from management controller 120 over communication channel 170 regardless of whether serial information is redirected through management controller 120. Thus, in some embodiments of the invention, remote computing devices use communication channel 170 to exchange both redirection and non-redirection packets with management controller 120. Redirection packets are interleaved with non-redirection packets in some embodiments of the invention.

FIGS. 5A and 5B illustrate certain aspects of an alternate embodiment of the invention in which serial information is transparently redirected to/from a management bus. FIG. 5A is a block diagram of blade server 500 implemented according to an embodiment of the invention. Blade server 500 includes serial controller 130, management controller 120, system interconnect 140, and management bus 570. Management bus 570 is a communication channel dedicated to the transfer of management information. Management busses are well known in the art and will not be further described except as they relate to embodiments of the invention.

In the embodiment illustrated in FIG. 5A, the applications and operating system running on blade server 500 send management information to serial controller 130. The stream of serial information is transparently redirected from a serial port (not shown) to management controller 120 through transmit information line 155 and receive information line 150, in an embodiment of the invention. Transparent redirection means that the applications and operating system running on blade sever 500 interact with serial controller 130 as if serial controller 130 exchanges information with a serial port. Thus, no special drivers or operating system modifications are necessary, in an embodiment of the invention.

Management controller 120 receives/transmits the stream of serial information at UART 525. The received serial information is delivered to Packetizer 440, in an embodiment of the invention. Packetizer 440 prepares the serial information for transport on management bus 570. For example, in an embodiment of the invention, management bus 570 complies with the Electronic Industries Association (EIA)/Telecommunications Industry Association (TIA) Recommended Standard-485 entitled, "Balanced Differential Drivers Balanced Line Drivers" (RS-485 standard). In an alternate embodiment of the invention, management bus 570 complies with the I2C standard, entitled "The I2C Bus Specification Version 2.1, January 2000." In either case, packetizer 440 prepares the serial information for transport according to the appropriate standard. A person of ordinary skill in the art will see that management bus 570 can be any proprietary or standard interconnect.

Remote computing devices send blade server 500 information packets via management bus 570. In an embodiment of the invention, the received information packets can be either redirection packets or non-redirection packets. Redirection packets include packets that have been redirected from one or more serial ports to management bus 570 either by remote computing devices or by blade server 500. Non-redirection packets are discussed below in connection with FIG. 5B. Redirection packets that are received via management bus 570 are sent to packetizer 440, in an embodiment of the invention. Packetizer 440 reformats the received redirection packets into a stream of serial information. The stream of serial information is communicated to serial controller 130 through UART 525 and receive information line 150. Applications running on blade server 500 receive the serial information via system interconnect 140 as if the serial information reached blade server 500 through a serial port.

FIG. 5B is a block diagram of selected elements of blade server rack 550. Blade server rack 550 includes one or more chassis 575 and management server 590. Chassis 575 includes blade servers 500 through 500G, chassis management module (CMM) 580, and management bus 570. Chassis management module 580 orchestrates the exchange of management information between blade servers 500 through 500G and also between chassis 575 and management server 590. Management server 590 controls the exchange of management information throughout blade server rack 550.

Referring now to FIGS. 5A and 5B together, in an embodiment of the invention, an application running on blade server 500 sends information to serial controller 130 using standard serial controller drivers. Serial controller 130 redirects the information to management controller 120. Management controller 120 packetizes the information (e.g., using packetizer 440) and delivers the packets to management bus 570. The packets may be sent to blade server 500B, CMM 580, or management server 590, in an embodiment of the invention. Similarly, any of the blade servers 500B through G, CMM 580, or management server 590 may redirect serial information onto management bus 570 and send it to blade server 500, in an embodiment of the invention. Blade server 500, in an embodiment of the invention, reformats the redirection packets and delivers them to system interconnect 140 as described above. Since blade servers 500 through 500G, redirect serial information to management bus 570, they do not require physical serial cables. Thus, the expense and complexity of blade server rack 550 is significantly reduced.

Figure 6:
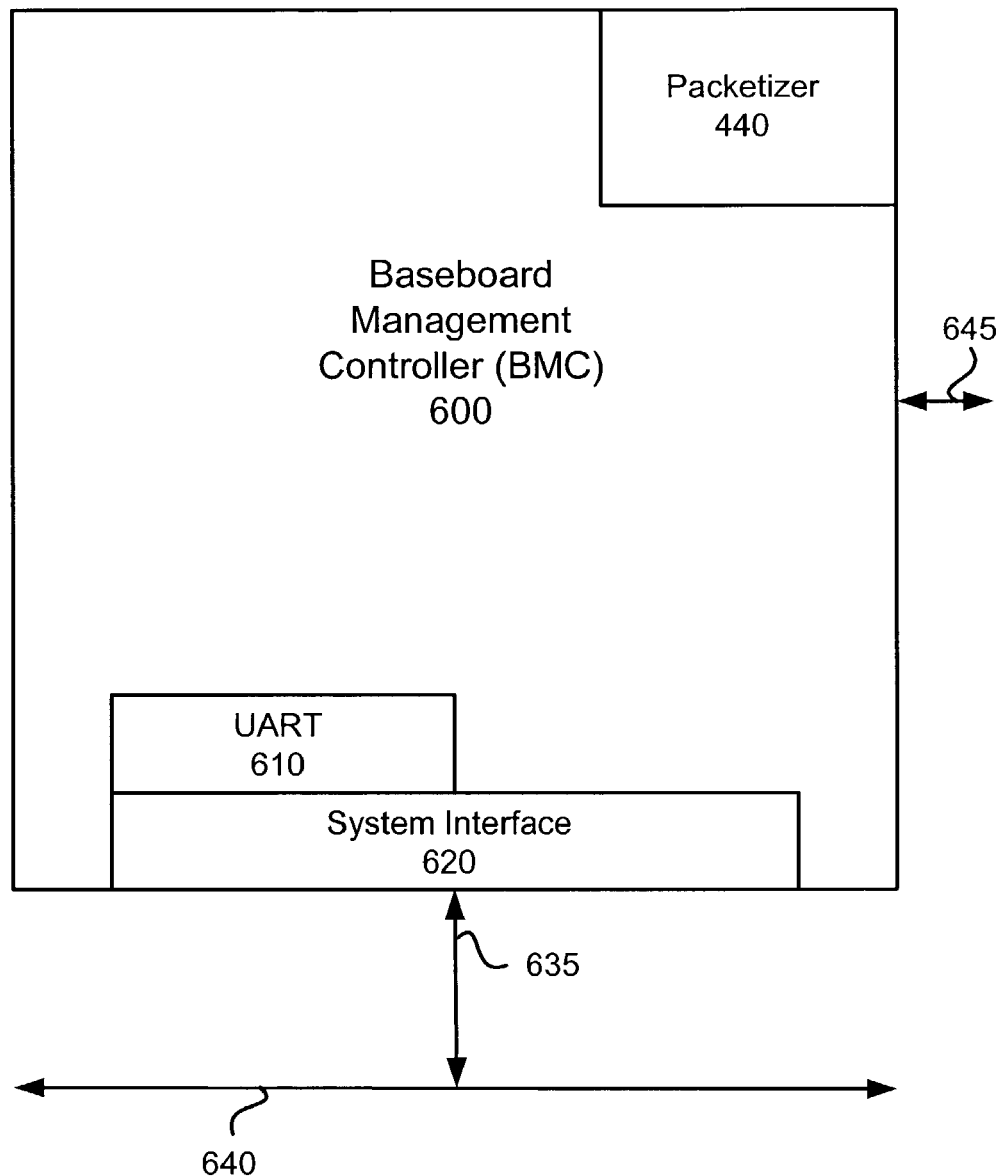
FIG. 6 illustrates certain aspects of another alternative embodiment of invention in which a baseboard management controller (BMC) has an embedded host serial interface.

FIG. 6 illustrates certain aspects of another alternative embodiment of the invention in which a baseboard management controller (BMC) has an embedded host serial interface. An embedded host serial interface may be serial controller circuitry built into a BMC. FIG. 6 is a block diagram of BMC 600 implemented according to an embodiment of the invention. BMC 600 includes UART 610, system interface 620, and packetizer 440. System interface 620 receives information from system interconnect 640 through communication channel 635. System interconnect 640 permits communication between BMC 600 and other elements of a computing device (not shown). System interconnect 640 may include a wide variety of signal lines including one or more of a memory bus, peripheral bus, local bus, host bus, bridge, optical, electrical, and other propagated signal lines.

Figure 1:
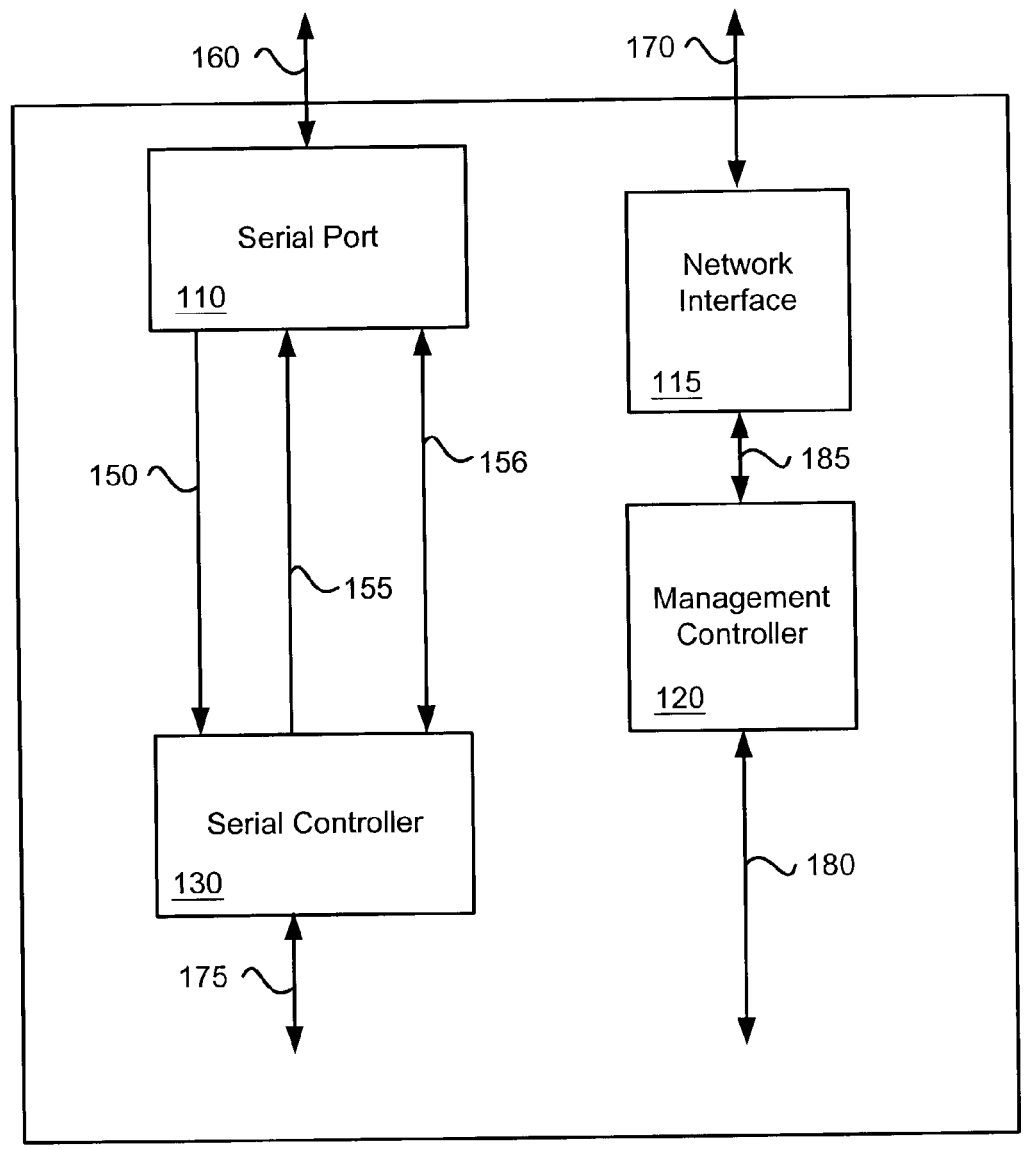
FIG. 1 is a block diagram illustrating selected components of conventional computing device 100.

UART 610 and system interface 620 may function as a virtual serial controller, in an embodiment of the invention. According to such an embodiment, a computing device sends information to BMC 600 that may otherwise be sent to a serial controller (e.g., serial controller 130 shown in FIG. 1) in conventional computing devices (e.g., conventional computing device 100). BMC 600 packetizes the virtual serial information and communicates it via communication channel 645. In some embodiments of the invention, communication channel 645 may deliver the packetized information to a network interface (e.g., network interface 115). In alternative embodiments of the invention, BMC 600 may have an integrated network interface and communication channel 645 may connect to the network itself. In yet other embodiments of the invention, communication channel 645 may be a management bus (e.g., management bus 570). A person of ordinary skill in the art appreciates that, in embodiments of the invention using an embedded serial interface, the fact that no RS-232 connection exits is hidden from the host system software.

Figure 7:
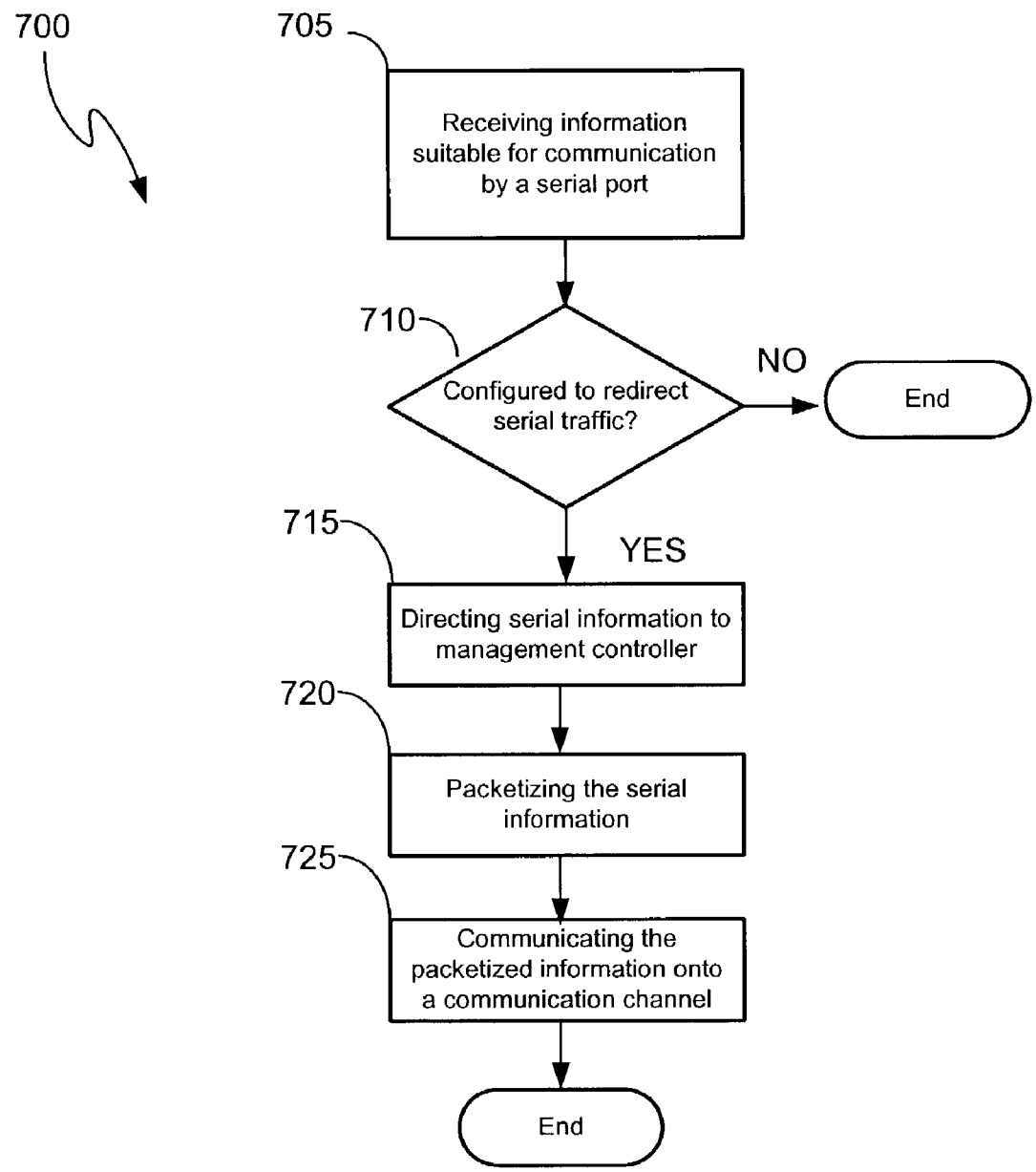
FIG. 7 is a flow diagram illustrating certain aspects of a method for redirecting serial information to a network connection or a management bus.
Figure 8:
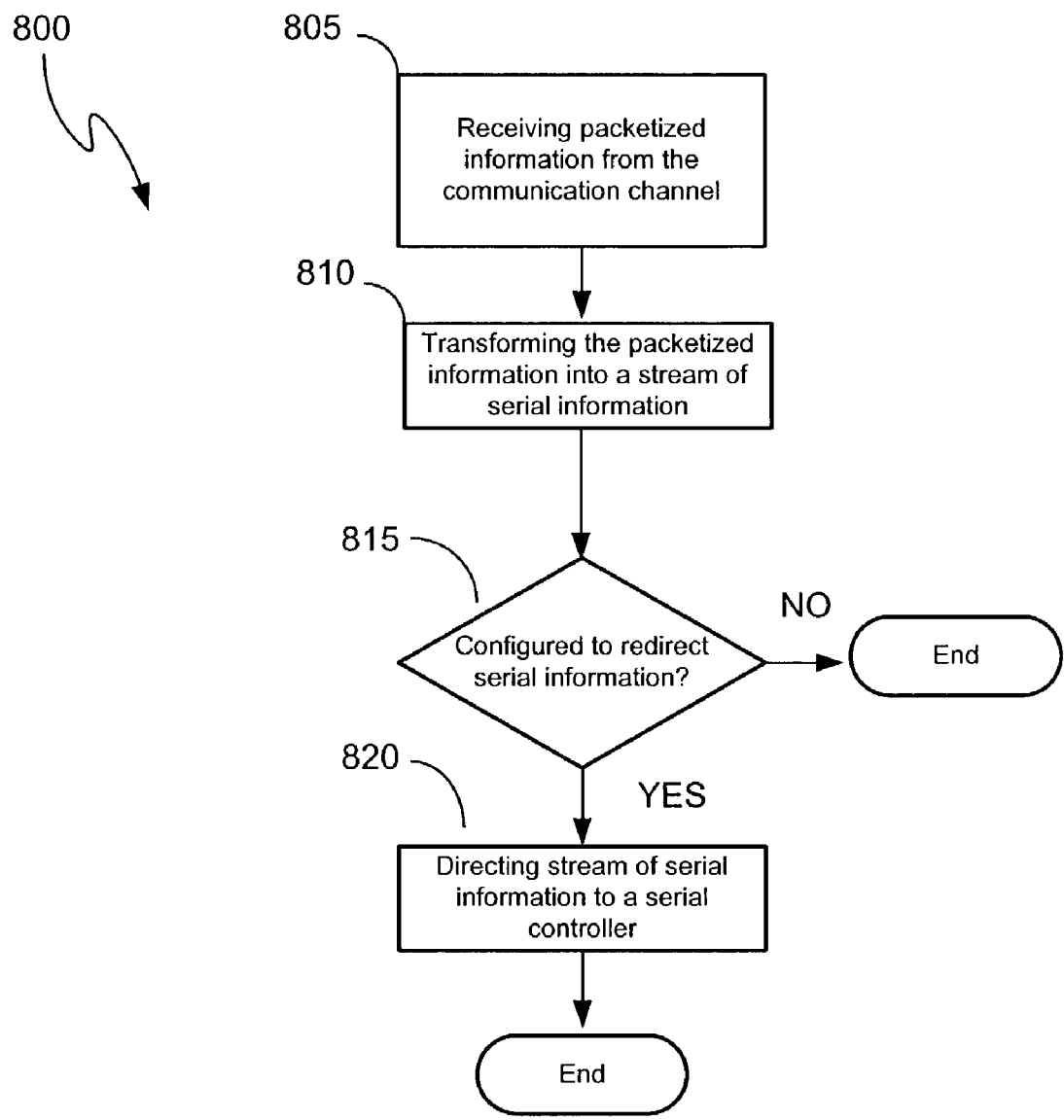
FIG. 8 is a flow diagram illustrating certain aspects of a method of returning redirected information to a serial controller.

Turning now to FIGS. 7 and 8, the particular methods associated with embodiments of the invention are described in terms of computer software and hardware with reference to two flowcharts. The methods to be performed by a serial information redirect system constitute state machines or computer programs made up of computer-executable instructions. Describing the methods by reference to a flowchart enables one of ordinary skill in the art to develop such programs including such instructions to carry out the methods on suitably configured computing devices (the processor of the computing device executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flow diagram illustrating certain aspects of a method for redirecting serial information to a network connection or a management bus. Referring to process block 705, in one embodiment of the invention, a serial controller receives information suitable for communication by a serial port. Switching logic (e.g., switching logic 410A and B of FIG. 2) determines whether the serial information is redirected to a management controller at process block 710. In an embodiment of the invention, redirection configuration is accomplished during the boot process of a computing device. If the switching logic indicates that the serial information should be redirected, then the serial information is sent to the management controller in process block 715, according to an embodiment of the invention. The redirected serial information is packetized in process block 720. The packetized information is communicated onto a communication channel in process block 725. In some embodiments of the invention the communication channel is a local area network (e.g., an Ethernet LAN). In alternate embodiments of the invention, the communication channel is a management bus (e.g., a bus that is compliant with the RS-485 standard).

FIG. 8 is a flow diagram illustrating certain aspects of a method of returning redirected information to a serial controller. Referring to process block 805, in one embodiment of the invention, the management controller receives redirection packets from the communication channel. The redirection packets are transformed into a stream of serial information at process block 810. In some embodiments of the invention, a packetizer implemented in firmware transforms the redirection packets into a stream of serial information. Switching logic (e.g., switching logic 410A and B of FIG. 2) determines whether the computing device is configured to redirect information in process block 815. If the computing device is configured to redirect serial information, then the serial information is sent to the serial controller via a UART in process block 820, according to an embodiment of the invention.

Figure 9:
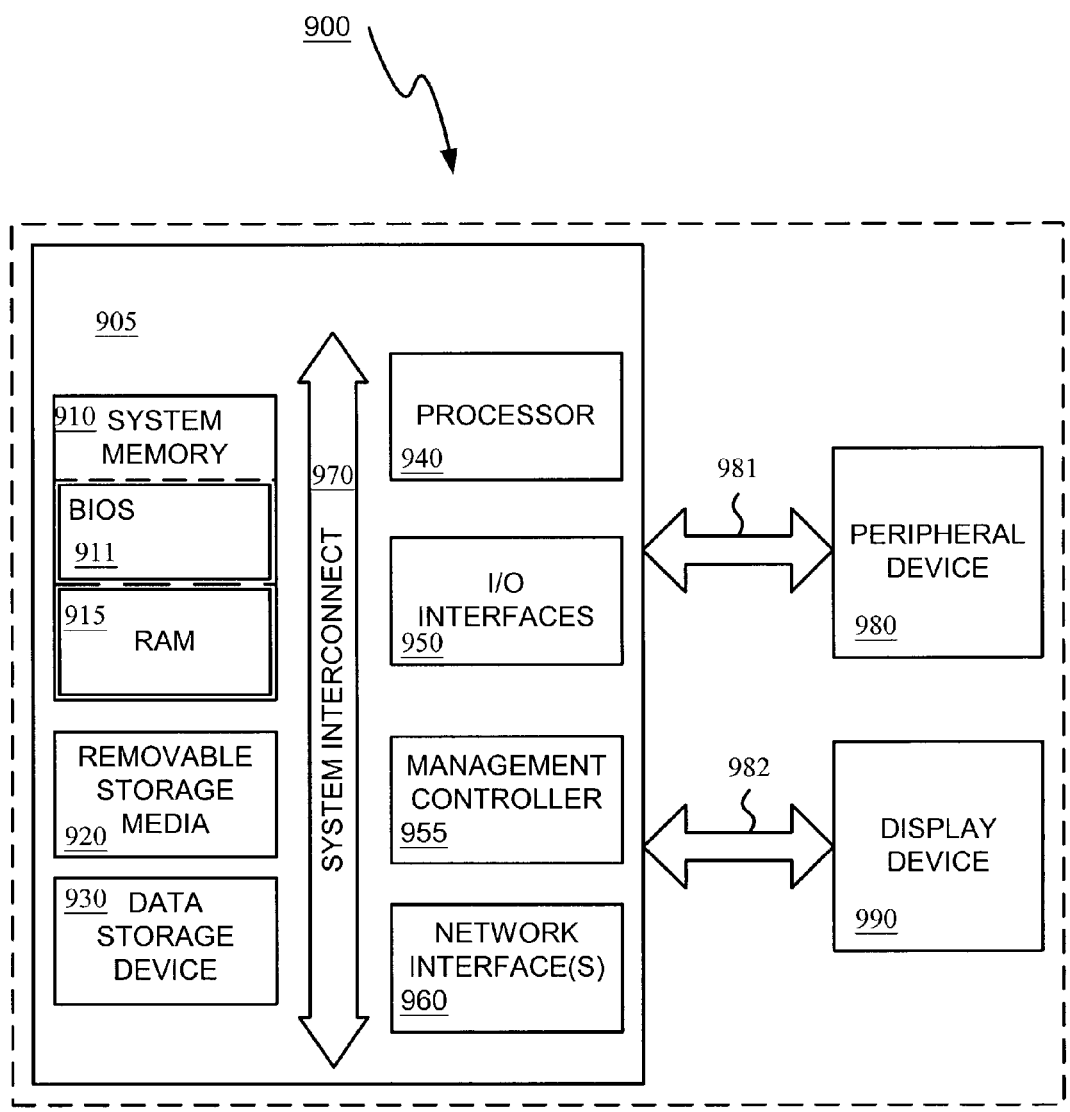
FIG. 9 illustrates computing system 900 in which an embodiment of the invention is implemented.

FIG. 9 illustrates computing system 900 in which an embodiment of the invention is implemented. Computing system 900 includes general purpose computing device 905 with system memory 910, removable storage media 920, a data storage device 930, one or more processing units 940, input/output (I/O) interfaces 950, management controller 955, network interfaces 960, and system interconnect 970. Computing system 900 may include display device 990 and one or more peripheral devices 980.

One or more processing devices 940 may include a microprocessor, microcontroller, field programmable gate array (FPGA), application specific integrated circuit (ASIC), central processing unit (CPU), and similar devices that access instructions from system storage (e.g., system memory 910, removable storage media 920, or data storage devices 930), decode them, and execute those instructions, performing arithmetic and logical operations. Computing system 900 may also include one or more I/O interfaces 950. I/O interfaces may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. In an embodiment of the invention, a serial controller is equipped with switches and switching logic to redirect serial information through management controller 955. In an alternate embodiment of the invention, a super I/O controller uses switches and switching logic to redirect serial information through management controller 955. A super I/O controller may be a single chip that performs a number of functions that, in computing devices without a super I/O controller, are performed by several pieces of hardware. Typically super I/O controllers perform the functions of a serial port controller, a parallel port controller, and a floppy disk drive controller.

Management controller 955 controls and monitors management features of system 900. In some embodiments of the invention, the functions of management controller 955 are distributed among two or more separate controllers. The functions of the management controller include power supply on/off control, hard reset control, video blanking, watchdog timers, temperature monitoring, voltage monitoring, fan monitoring, chassis intrusion monitoring and the like. Management controller 955 can be polled for current status or configured to automatically send an alert message when an error condition is detected either manually or by software. Management controller 955 includes a packetizer, in an embodiment of the invention.

A packetizer prepares the redirected serial information for transport over a communication channel, in an embodiment of the invention. The communication channel may be a LAN, management bus, or the like. In an embodiment of the invention, management controller 955 access the communication channel via network interfaces 960. In some embodiments of the invention, management controller 955 receives both redirection and non-redirection packets via the communication channel. The redirection packets are reformatted as serial information, in an embodiment of the invention, and sent to the serial controller, which may be embedded in a super I/O controller.

Network interfaces 960 may include one or more of an Ethernet interface, Token Ring interface, Fiber Channel High Speed interface, Fiber Distributed Data Interface, management bus interface or the like. In an embodiment of the invention, management controller 955 uses network interface 960 to communicate redirection and non-redirection packets over a network or a management bus. Management controller 955 and network interfaces 960 may be integrated into a single device, in an embodiment of the invention. In some embodiments of the invention, in which computing system 900 is a server or blade server, management controller 955 and/or network interfaces 960 are integrated into the server baseboard.

System memory 910 may encompass a wide variety of memory devices, including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. System memory 910 may store program modules such as routines, programs, objects, images, data structures, program data, and other program components that perform particular tasks or implement particular abstract data types that facilitate system use. System memory 910 may include basic input/output system (BIOS) 911. BIOS 911 may store boot images and basic routines that initialize and facilitate the transfer of information between elements of computing system 900.

Data storage device(s) 930 includes one or more hard disks (or other magnetic disks), flash memory devices, or other memory device(s). Removable storage media 920 may include floppy disks, ZIP disks, other magnetic disks, compact disks (CD-ROM), digital versatile/video disks (DVD), other optical storage media, flash memory devices, and other removable system-readable media that store instructions and/or data.

System interconnect 970 permits communication between the various elements of computing system 900. System interconnect 970 may include a wide variety of signal lines including one or more of a memory bus, peripheral bus, local bus, host bus, bridge, optical, electrical, acoustical, and other propagated signal lines. Peripheral devices 980 may include printers, scanners, speaker, keyboards, keypads, pointing devices, and other similar devices. Display devices 990 may include one or more monitors, LCD screens, projectors, and other similar devices. Peripheral devices 980 and display devices 990 may connect to the rest of computing system 900 through interconnects 981 and 982.

System 900 may include additional components and also may omit some of the components shown in FIG. 9. A person of ordinary skill in the art appreciates that computing system 900 may encompass a wide variety of computing systems including personal computers, servers, blade servers, network processing units (NPU), network switches, hand-held devices, multiprocessor systems, microprocessor-based or programmable consumer electronics, network PCs, minicomputers, mainframe computers, personal digital assistants, digital cameras, calculators, and other digital devices.

The foregoing description and drawings include references to details by way of example and explanation in describing various embodiments of the invention. These details should not be interpreted as limiting the scope of the invention, which is subsequently set forth in the claims. One skilled in the art will appreciate that not all possible embodiments of the invention have been presented, but many alterations and/or modifications could be made without departing from the broader spirit and scope of the invention.

What is claimed is:

1. An apparatus comprising:
    a serial controller to control the input and output of information;
    a management controller selectively coupled with the serial controller to exchange information between the serial controller and a management bus; and
    switching logic to selectively couple the serial controller with the management controller to provide an alternate path for the information, wherein the switching logic is capable of a first configuration to route the information between the serial controller and a serial port and a second configuration to route the information between the serial controller and the management controller.

2. The apparatus of claim 1, wherein the switching logic is configured during a boot procedure.

3. The apparatus of claim 1, wherein the management controller controls the switching logic.

4. The apparatus of claim 1, wherein the management controller is coupled with a local area network (LAN) to communicate the information over the LAIN.

5. The apparatus of claim 1, wherein the management controller further comprises a packetizer.

6. The apparatus of claim 5, wherein the serial controller, the management controller, and the switching logic are elements of a server baseboard.

7. A server baseboard comprising:
    a serial controller to control the input and output of information;
    a management controller selectively coupled with the serial controller to exchange information between the serial controller and a management bus; and
    switching logic to selectively couple the serial controller to the management controller to direct the information to the management controller, wherein the switching logic is capable of a first configuration to route the information between the serial controller and a serial port and a second configuration to route the information between the serial controller and the management controller.

8. The server baseboard of claim 7, wherein the management controller further comprises a packetizer.

9. The server baseboard of claim 8, wherein a path for the information between the serial controller and the management bus is established when the switching logic is in the second configuration.

10. The server baseboard of claim 8, further comprising a local area network connected with the management controller, wherein a path for the information between the serial controller and the local area network is established when the switching logic is in the second configuration.

11. A system comprising:
    a computing device having a
        serial controller to control the input and output of information,
        a management controller selectively coupled with the serial controller to exchange information between the serial controller and a management bus, and
        switching logic to selectively couple the serial controller to the management controller, wherein the switching logic is capable of a first configuration to route the information between the serial controller and a serial port and a second configuration to route the information between the serial controller and the management controller; and
    another computuing device coupled with the computing device through a communication channel, the another computing device to exchange information with the computing device.

12. The system of claim 11, wherein the switching logic is configured during a boot procedure.

13. The system of claim 11, wherein the management controller further comprises a packetizer, the packetizer to receive information from the serial controller and to packetizer the information for communication on the communication channel.

14. The system of claim 11, wherein the computing device controls the switching logic.

* * * * *